US008839560B2

(12) United States Patent
Kita

(10) Patent No.: US 8,839,560 B2
(45) Date of Patent: Sep. 23, 2014

(54) POWER UNIT FOR MOVABLE MEMBER

(75) Inventor: Shinichiro Kita, Okusa-cho (JP)

(73) Assignee: Mitsui Kinzoku Act Corporation, Kanagawa (JP)

( * ) Notice: Subject to any disclaimer, the term of this patent is extended or adjusted under 35 U.S.C. 154(b) by 545 days.

(21) Appl. No.: 11/646,574

(22) Filed: Dec. 28, 2006

(65) Prior Publication Data

US 2008/0137322 A1 Jun. 12, 2008

(51) Int. Cl.
E05F 11/00 (2006.01)
H02K 7/11 (2006.01)
H02K 7/116 (2006.01)
H02K 5/22 (2006.01)

(52) U.S. Cl.
CPC .............. H02K 7/11 (2013.01); H02K 7/1166 (2013.01); H02K 5/22 (2013.01)
USPC ............................................. 49/360; 49/502

(58) Field of Classification Search
USPC ....................................... 49/360; 192/84.961
See application file for complete search history.

(56) References Cited

U.S. PATENT DOCUMENTS

| 3,036,679 | A | * | 5/1962 | Millington et al. | 192/84.94 |
| 4,126,215 | A | * | 11/1978 | Puro | 192/84.961 |
| 4,385,504 | A | * | 5/1983 | Perrone et al. | 62/259.1 |
| 4,432,446 | A | * | 2/1984 | Okano et al. | 192/84.961 |
| 5,138,293 | A | * | 8/1992 | Ishimaru | 335/289 |
| 5,138,795 | A | * | 8/1992 | Compeau et al. | 49/138 |
| 5,250,921 | A | * | 10/1993 | Van Laningham et al. | ... 335/296 |
| 5,806,246 | A | * | 9/1998 | Azuma | 49/360 |
| 5,812,044 | A | * | 9/1998 | Sakamoto | 335/299 |
| 5,952,908 | A | * | 9/1999 | Kubo | 336/192 |
| 5,967,282 | A | * | 10/1999 | Takahashi | 192/84.961 |
| 6,108,976 | A | * | 8/2000 | Kato et al. | 49/360 |
| 6,425,206 | B1 | * | 7/2002 | Noda et al. | 49/360 |
| 7,138,895 | B2 | * | 11/2006 | Chung | 335/299 |
| 7,287,804 | B2 | * | 10/2007 | Yamagishi et al. | 296/155 |
| 2004/0154852 | A1 | * | 8/2004 | Miyashiro et al. | 180/219 |
| 2005/0045444 | A1 | * | 3/2005 | Yoshida et al. | 192/84.941 |
| 2005/0183924 | A1 | * | 8/2005 | Fukumoto et al. | 192/84.961 |
| 2006/0086585 | A1 | * | 4/2006 | Boffelli | 192/84.31 |
| 2007/0011949 | A1 | * | 1/2007 | Isobe et al. | 49/475.1 |

FOREIGN PATENT DOCUMENTS

JP 2002-274289 * 9/2002 ............. B60R 16/02

* cited by examiner

Primary Examiner — Katherine Mitchell
Assistant Examiner — Catherine A Kelly
(74) Attorney, Agent, or Firm — Browdy and Neimark, PLLC

(57) ABSTRACT

This power unit includes a base plate fixed with an annular coil part, and a slot-shaped insertion hole formed at the base plate and extending in a radiating direction to the annular coil part. After a lead wire of the annular coil part is inserted into the insertion hole from one side of the base plate at which the annular coil part is provided, the lead wire is extended in the radiating direction along the insertion hole. Next, the lead wire is led out to the other side of the base plate. Covers having semicircular shapes in cross section are provided to the ends of the insertion hole.

11 Claims, 3 Drawing Sheets

US 8,839,560 B2

POWER UNIT FOR MOVABLE MEMBER

FIELD OF THE INVENTION

The present invention relates to a power unit for a movable member, and more particularly, to an improvement of a housing of the power unit.

BACKGROUND OF THE INVENTION

Conventionally, there have been proposed a large number of power units for moving movable members such as slide doors or windows of a vehicle, and the conventional power unit includes a rotational body to move a movable member by being rotated, a motor for driving the rotational body, an electromagnetic clutch mechanism for switching to a connecting state in which a rotation of the motor is transmitted to the rotational body and a disconnecting state in which a rotation of the motor is not transmitted to the rotational body, and a lead wire to supply power to an annular coil part of the electromagnetic clutch mechanism.

The lead wire is led from the interior of the housing via an insertion hole or an opening formed at a housing of a power unit to the exterior of the housing, to be connected to a control circuit or the like of the power unit. However, there is a lead wire in which a direction of leading the lead wire is set to an axial direction of the annular coil part (which is the same as an axial direction of a rotational body) (refer to Japanese Patent Application Laid-Open No. 57-72728), set to a radiating direction thereof (refer to Japanese Patent Application Laid-Open No. 2003-82926), or set to be bent in a radiating direction after extending in an axial direction (refer to Japanese Patent Application Laid-Open No. 2005-213762).

With respect to the conventional lead wires, there is the problem in the structure in which the lead wire passes through the housing at an angle perpendicular to a wall surface of a housing regardless of the direction in which a lead wire is led out. In this structure, in order to avoid interference between the lead wire and the rotational body, a great dead space where the rotational body cannot be disposed is left in the vicinity of the lead wire.

To point out concretely, in Japanese Patent Application Laid-Open No. 57-72728, because a lead wire (13a) is led out to the exterior via an insertion hole formed at an upper wall of a housing, the interference between two bodies of rotation (10, 23) disposed in the vicinity of the upper wall and the lead wire (13a) becomes problematic, which leads to great restrictions on sizes, shapes, positions for attaching, and the like of the bodies of rotation.

Further, in Japanese Patent Application Laid-Open No. 2003-82926, in order to avoid interference between a lead wire (57a) extending in a radiating direction and an outer tubular portion of a rotational body (53) installed at an outer circumference of a coil part, the outer tubular portion must be separated in an axial direction from the lead wire, which poses an impediment to downsizing of the power unit in the axial direction of the coil part.

Further, in Japanese Patent Application Laid-Open No. 2005-213762, in order to avoid interference between a lead wire (38) and a motor (39), the motor must be separated in an axial direction from the lead wire, which poses the same problem as that in Japanese Patent Application Laid-Open No. 2003-82926.

SUMMARY OF THE INVENTION

It is therefore an object of the present invention to provide a power unit which can be expected to be downsized in an axial direction of a drum shaft by reducing a dead space formed by a lead wire.

Further, it is another object of the present invention to provide a power unit in which a dead space by the lead wire is reduced by preventing a wobble of the lead wire.

It is still another object of the present invention to provide a power unit capable of suppressing a wobble of a lead wire with a logical structure.

DESCRIPTION OF THE PREFERRED EMBODIMENTS

Figure 1:
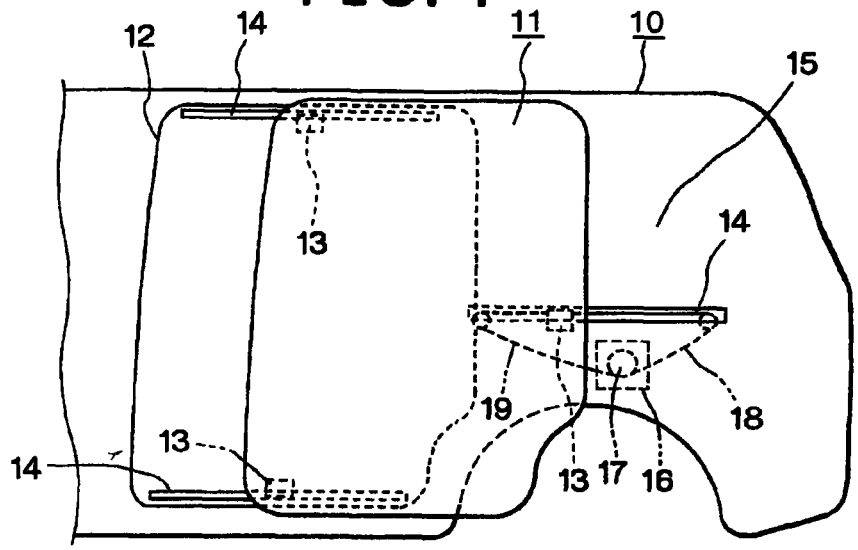
FIG. 1 is a side view showing a relationship among a car body, a slide door, and a power unit.

Embodiments of a power unit according to the present invention will be described with reference to the drawings. In FIG. 1, a car body 10 and a slide door 11 serving as an example of a movable member are shown. Other examples of the movable member include a rear door and the like. The slide door 11 is attached slidably to the car body 10, and a door opening 12 which can be closed by the slide door 11 is provided to the car body 10. A plurality of guide rails 14, with which a plurality of guide rollers 13 provided to the slide door 11 are slidably engaged, are provided to the car body 10, and the slide door 11 is attached slidably to the car body 10 due to the engagement of the guide rollers 13 with the guide rails 14.

Figure 2:
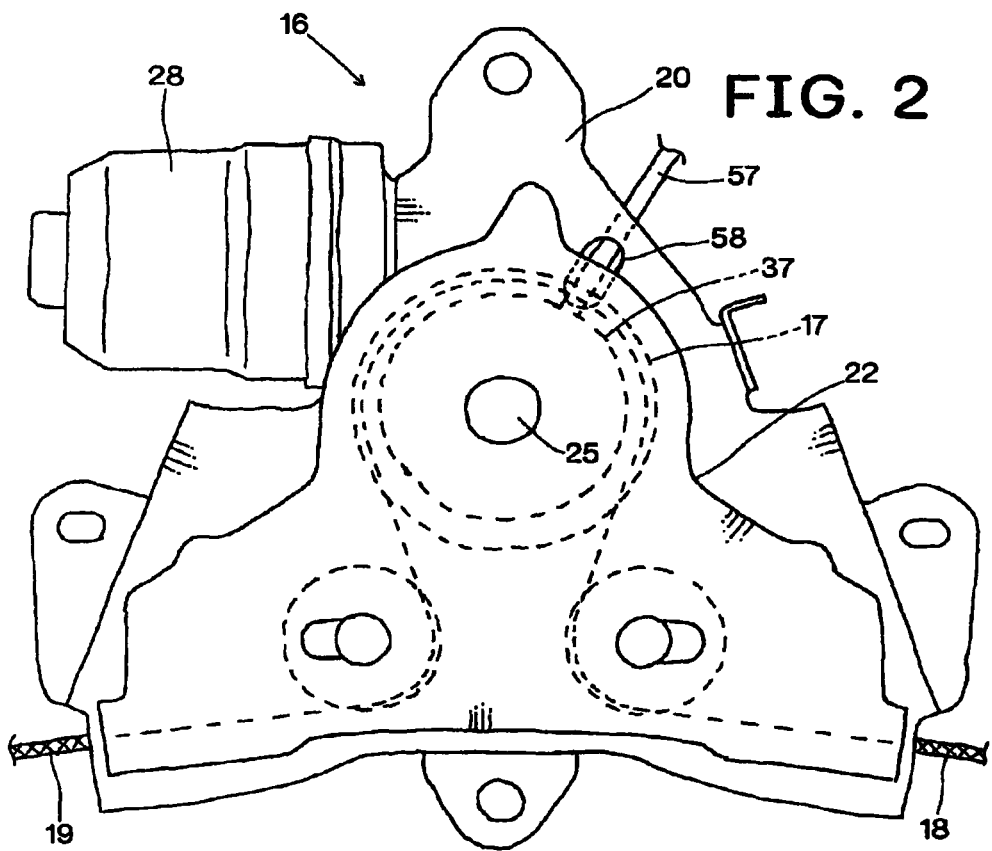
FIG. 2 is a side view of the power unit.
Figure 3:
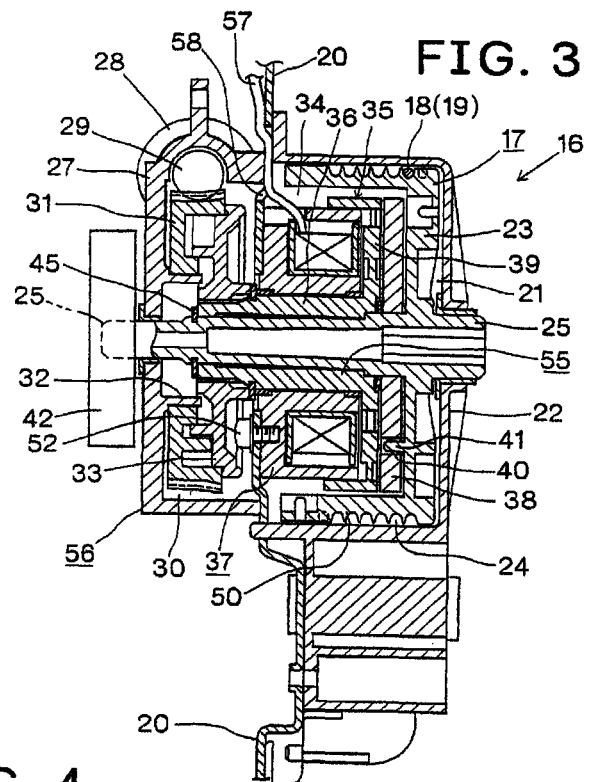
FIG. 3 is a sectional view of the power unit.

A power unit 16 is provided in a car interior side space of a quarter panel 15 of the car body 10. A cable drum 17 serving as a rotational body is provided to the power unit 16 as shown in FIGS. 2 and 3, and rear end sides of a cable for opening door 18 and a cable for closing door 19 are respectively connected to the cable drum 17. The tip end sides of the cables 18 and 19 are connected to the slide door 11, and when the cable drum 17 is rotated in a direction of opening door, the cable for opening door 18 is wound up and the cable for closing door 19 is drawn out, and the slide door 11 is moved in the direction of opening door. When the cable drum 17 is rotated in a direction of closing door, the cable for opening door 18 is drawn out and the cable for closing door 19 is wound up, and the slide door 11 is moved in the direction of closing door.

Note that a position at which the power unit 16 is disposed is not limited to the car interior side space of the quarter panel 15. As described in detail in Japanese Patent Application Laid-Open No. 2004-36193, the power unit 16 can be disposed in an internal space of the slide door 11, and in this case, the tip end sides of the cables 18 and 19 are respectively connected to the car body 10.

As shown in FIG. 3, the power unit 16 includes a vertical plate type metal base plate 20 fixed to the car body 10 (or the slide door 11) with bolts or the like, a drum side (rotational body side) case 22 made of resin partitioning a first storage room 21 is fixed to one side of the base plate 20, and the cable drum 17 is placed in the first storage room 21.

Figure 4:
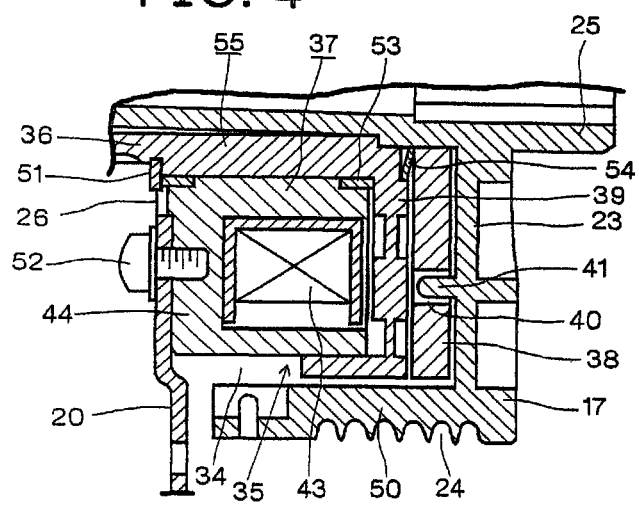
FIG. 4 is an enlarged sectional view of the power unit.

The cable drum 17 forms a cylindrical shape having a drum rim member 23 on its one side surface, and the other side of the drum 17 is opened to the exterior. Cable grooves 21 on which the cables 18 and 19 are wound around are formed on the outer circumferential surface of the cable drum 17. The cable drum 17 is made of resin, and a drum shaft 25 is formed integrally with the center thereof, and an end of one side of the drum shaft 25 is projected outward from the drum rim member 23 to be supported rotatably by the drum side case 22. The other end of the drum shaft 25 is projected to the other side through a continuous hole 26 (FIG. 4) of the base plate 20 to be supported rotatably by a gear side case 27 fixed to the other side of the base pate 20. Note that the base plate 20 and the cases 22 and 27 are collectively called a housing 56 in the present invention.

A normal/reverse rotation motor 28 of the power unit 16 is disposed to the other side of the base plate 20, and a cylindrical worm 29 is attached to an output shaft of the motor 28, and a worm wheel 31 installed in a second storage room 30 partitioned by the gear side case 27 is fitted into the cylindrical worm 29. The worm wheel 31 is supported rotatably to a boss portion 32 formed on an inner surface of the gear side case 27 such that its own center of axle coincides with the center of axle of the drum shaft 25. A cyclic transmission member 33 rotating integrally with the worm wheel 31 is installed in the vicinity of one side of the worm wheel 31.

A principal part of the electromagnetic clutch mechanism 35 of the power unit 16 is disposed in an internal space 34 surrounded by an outer circumferential surface 50 of the cable drum 17. When the clutch mechanism 35 is switched to a connecting state, a rotation of the worm wheel 31 (the cyclic transmission member 33) is transmitted to the cable drum 17. However, when the clutch mechanism 35 is returned to a disconnecting state, the engagement of the cable drum 17 with the worm wheel 31 (the motor 28) is disengaged, and the cable drum 17 is in a state of being rotatable with respect, to the worm wheel 31.

The electromagnetic clutch mechanism 35 includes a rotor 55 having a relatively long sleeve 36 provided to the central circumference of the drum shaft 25, an annular electromagnetic coil part 37 disposed at the outer circumferential portion of the sleeve 36, and a ring armature 38 disposed in the vicinity of the inner surface of the drum rim member 23.

The rotor 55 is configured not to move in the axial direction of the drum shaft 25 by being tied up to the drum shaft 25 with a fastener 45 such as an E-ring. However, the rotor 55 is relatively rotatable with respect to the drum shaft 25, and the end of the other side of the sleeve 36 of the rotor 55 is engaged into a keyway with the cyclic, transmission member 33, and in accordance therewith, the rotor 55 is always connected to the cyclic transmission member 33 via the worm wheel 31 at a side of the motor 28.

A ring flange 39 is integrally formed to an end of one end of the rotor 55, and the ring flange 39 is installed in the axial direction of the drum shaft 25 between the armature 38 and the electromagnetic coil part 37.

A very narrow clearance is provided with spacers 53 between the ring flange 39 and the electromagnetic coil part 37, and the electromagnetic coil part 37 is attached so as not to move in the axial direction to the sleeve 36 with a fastener 51 (FIG. 4) such as an E-ring tied up to the sleeve 36.

The armature 38 is biased to one side so as to be separated from the ring flange 39 by elastic force of a disc spring 54 provided between the armature 38 and the ring flange 39. One side surface of the ring flange 39 is formed as a touching surface with a high coefficient of friction, and when the armature 38 is attracted to the other side by magnetic force of the electromagnetic coil part 37 against the elastic force of the disc spring 54, the armature 38 touches the ring flange 39 with a high coefficient of friction, and in accordance therewith, a rotation of the ring flange 39 (the motor 28) is transmitted to the armature 38.

A plurality of engagement holes 40 in the axial direction of the drum shaft 25 are formed at the armature 38, and a plurality of drum pins 41 projected from the drum rim member 23 to the other side are engaged slidably with the engagement holes 40. The engagement of the drum pins 41 with the engagement holes 40 is not disengaged even when the armature 38 is moved in the axial direction of the drum shaft 25 by magnetic force of the electromagnetic coil part 37, and therefore, the armature 38 is connected to be always rotated integrally with the cable drum 17. When the armature 38 is adhered firmly to the flange 39 by magnetic force of the electromagnetic coil part 37, the clutch mechanism 35 becomes a connecting state to transmit the power of the motor 28 to the cable drum 17, and when the electromagnetic coil part 37 is turned off, the frictional contact between the armature 38 and the flange 39 is released, and the clutch mechanism 35 is made in a disconnecting state, thereby releasing the connection between the motor 28 and the cable drum 17.

In accordance with the above-described structure, the armature 38 can be disposed in close vicinity to the side face on the other side of the drum rim member 23 of the cable drum 17, and a side space of the drum rim member 23 can be effectively utilized. Then, because the armature 38 can be connected to the cable drum 17 without involving the drum shaft 25, a processing step for connecting the armature 38 to the drum shaft 25 is made redundant, and the drum shaft 25 is freed from a reduction in strength due to the processing step, which makes it possible to integrally form the drum shaft 25 and the cable drum 17 from resin.

With respect to the clutch mechanism 35, because the armature 38, the flange 39, and the electromagnetic coil part 37 are provided together in the order from the drum rim member 23 to the other side, those can be assembled to the drum shaft 25 (the cable drum 17) in advance. First, the armature 38 and the disc spring 54 are inserted to the drum shaft 25, the rotor 55 is then attached to the drum shaft 25 with the plug-in fastener 45, the coil part 37 is attached to the outer circumference of the sleeve 36 of the rotor 55, and the coil part 37 is attached to the sleeve 36 with the fastener 51. In this way, it is possible to prepare the clutch mechanism 35 and the cable drum 17 as an assembly. Note that this assembling order can be changed.

A field 44 at the outer circumference of the coil 43 of the electromagnetic coil part 37 is fixed to one side surface of the base plate 20 with a screw 52 or the like. The continuous hole 26 of the base plate 20 is sized to an extent that the sleeve 36 can pass through, and the base plate 20 made of metal is disposed in as wide a range as possible on the other side surface of the electromagnetic coil part 37. In accordance therewith, the base plate 20 made of metal functions as a magnetic shield for magnetic force generated by the electromagnetic coil part 37, and it can be greatly reduced that a magnetic field of the electromagnetic coil part 37 extends to the other side from the base plate 20.

Further, provided that the electromagnetic coil part 37 is directly fixed to the base plate 20 made of metal, the base plate 20 made of metal can be used as a heat sink for the electromagnetic coil part 37, and it is possible to alleviate an efficiency decrease clue to heat generation from the electromagnetic coil part 37. Moreover, even when there is some wobble in the electromagnetic coil part 37 disposed between the fastener 51 and the flange 39, provided that the electromagnetic coil part 37 is fixed to the base plate 20, the electromagnetic coil part 37 can be prevented from wobbling in the axial direction with respect to the rotor 55, which suppresses generation of oscillation noise or the like.

The end of the other side of the drum shaft 25 is projected outward on the other side over the gear side case 27, and a sensor unit 42 for measuring a rotational speed, a rotation direction, and a rotational quantum of the drum shaft 25 (cable drum 17) is attached to the projected portion. The sensor unit 42 is a magnetic sensor formed from a magnet and a Hall effect IC, and because a magnetic field of the electromagnetic coil part 37 having an adverse effect on the sensor unit 42 is shielded to a large extent by the base plate 20, the sensor unit 42 is not necessarily separated especially from the electromagnetic coil part 37, and therefore, a distance of projection of the drum shaft 25 to the other side can be shortened.

Therefore, in the present invention, the electromagnetic coil part 37 and the motor 28 are respectively disposed at one side and the other side of the base plate 20 made of metal fixed to the car body 10 or the slide door 11 with bolts or the like. In accordance therewith, the imbalance in weights at the one side and the other side of the base plate 20 can be reduced, which makes it possible to reduce metal fatigue exerted onto the base plate 20 made of metal by an oscillation during vehicle driving. Then, because the heavy loads are dispersed at the one side and the other side of the base plate 20, the center of gravity of the power unit 16 can be approximated to the base plate 20 in the axial direction of the drum shaft 25, and in accordance therewith, a difference in the thickness between the one side and the other side of the base plate 20 is made smaller. Therefore, the power unit 16 is capable of freely performing up-down reversing layout, right-left reversing layout, front-back reversing layout, and the like, and is made excellent in layout performance corresponding to a shape of an installation space.

Figure 5:
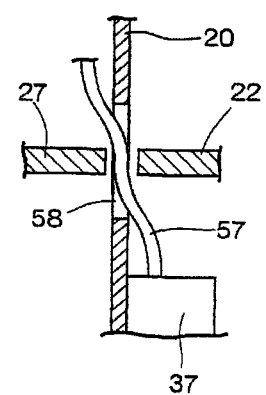
FIG. 5 is an enlarged sectional view showing an insertion hole formed at a base plate of the power unit.

As shown in FIGS. 3 and 5, the lead wire 57 of the electromagnetic coil part 37 extends toward the base plate 20, and an insertion hole 58 for guiding the lead wire 57 to the exterior of the housing 56 is formed at the base plate 20. The insertion hole 58 forms a long slit shape extending in a radiating direction of the drum shaft 25 (the coil part 37) (refer to FIG. 2). The lead wire 57 inserted into the slit-shaped insertion hole 58 from one side of the base plate 20 (a side at which the coil part 37 is provided) lies down in a length direction in the slit-shaped insertion hole 58, and thereafter, the lead wire 57 is led out to the other side of the base plate 20 from the insertion hole 58. The respective ends of the cases 22 and 27 are disposed at the both sides in the vicinity of the insertion hole 58, and the lead wire 57 is prevented from being fallen off from the insertion hole 58 by the cases 22 and 27.

In this way, provided that the lead wire 57 is made to lie down in the insertion hole 58, the lead wire 57 can be led out to the exterior of the housing 56 by utilizing a thickness of the base plate 20. Therefore, the formation of a dead space with respect to a rotational body (the cable drum 17 or the rotor 55) by the lead wire 57 is made much less than that of the conventional art, which makes it possible to make an attempt to downsize the drum shaft 25 of the power unit in the axial direction.

Figure 6:
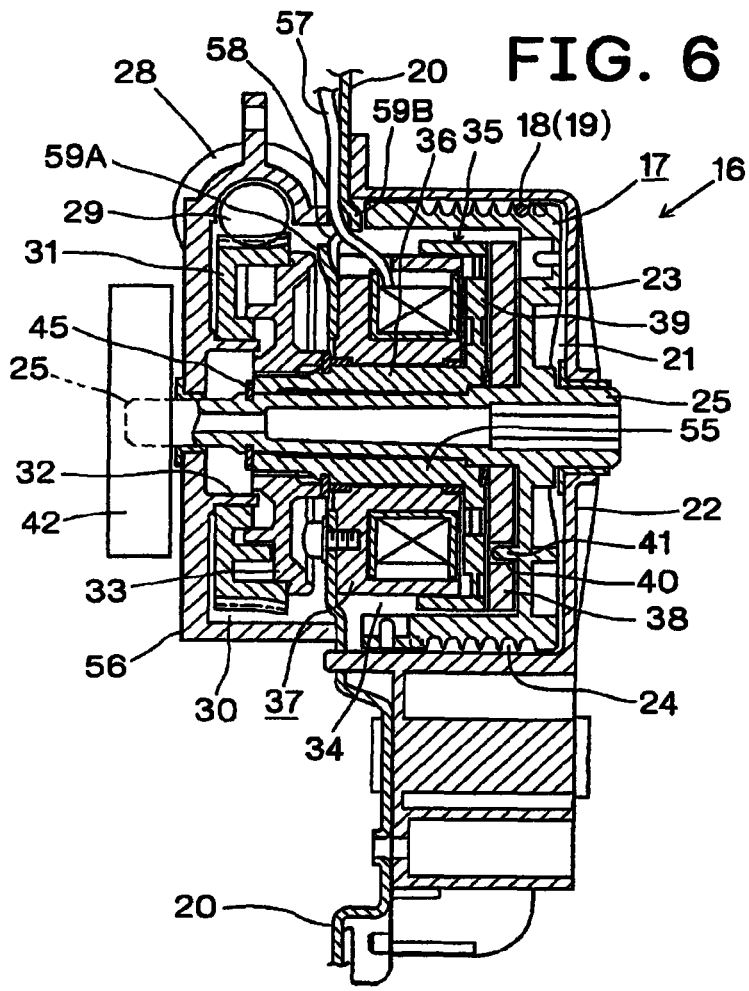
FIG. 6 is a sectional view of the power unit having an insertion hole according to a second embodiment.
Figure 7:
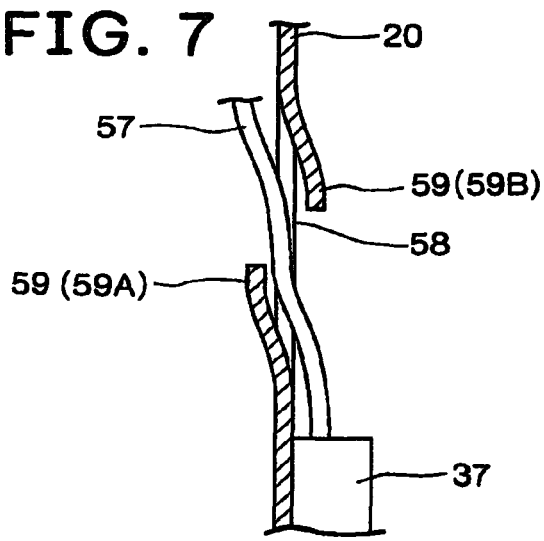
FIG. 7 is an enlarged sectional view showing the insertion hole according to the second embodiment.
Figure 8:
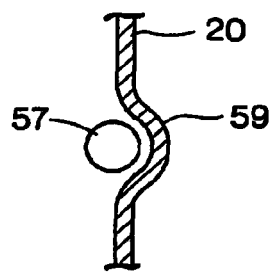
FIG. 8 is an enlarged sectional view showing the insertion hole according to the second embodiment.

FIGS. 6 to 8 show a second embodiment of the insertion hole 58. In the second embodiment, a lead wire cover 59 in a semicircular shape in cross section is formed at an end of the insertion hole 58 by press working at the time of forming the slit-shaped insertion hole 58 at the base plate 20. The cover 59 preferably includes an entrance side cover 59A formed at a first end at a side in close vicinity to the annular coil part 37 of the insertion hole 58 and an exit side cover 59B formed at a second end at a side separated from the annular coil part 37 of the insertion hole 58. However, those are not necessarily provided in a pair, and may be formed at only one end.

The entrance side cover 59A evaginates to the other side of the base plate 20 in order to receive the lead wire 57 extending from the electromagnetic coil part 37 into the insertion hole 58, and the exit side cover 59B evaginates to the one side of the base plate 20 in order to lead the lead wire 57 out to the other side of the base plate 20.

The cover 59 is formed in the case where a rotational body such as the cable drum 17 or the cyclic transmission member 33 is disposed in close vicinity to the insertion hole 58, and provided that the cover 59 is disposed between the lead wire 57 and the rotational body, it is possible to dispose the rotational body in the axial direction in close vicinity to the base plate 20 without leading to error contact between the lead wire 57 and the rotational body, which makes it possible to make an attempt to downsize the drum shaft 25 of the power unit 16 in the axial direction.

Further, provided that an end of the case 22 (or 27) is approximated to or made to touch the lead wire 57 which is not covered with the cover 59, it is possible to effectively prevent a wobble of the lead wire 57.

What is claimed is:

1. A power unit for a movable member comprising:
   a motor;
   a rotational body for moving a movable member when the rotational body is rotated about an axis of rotation by power of the motor;
   an electromagnetic clutch mechanism displaceable between a connecting state in which a rotation of the motor is transmitted to the rotational body and a disconnecting state in which a rotation of the motor is not transmitted to the rotational body;
   a lead wire to supply electric power to an annular coil part of the electromagnetic clutch mechanism, the lead wire having a length that extends in a length direction; and
   a base plate provided with the annular coil part and with an elongated slit having a length dimension, the base plate having two sides and a thickness between the two sides, and the elongated slit is an opening in the base plate that extends entirely through said base plate, from the one side of the base plate to the other side of the base plate, in a direction perpendicular to the length dimension of said elongated slit, the base plate extending in a direction generally perpendicular to the axis of rotation and the elongated slit extending along a plane perpendicular to the axis of rotation,
   wherein the annular coil part is disposed at one side of the base plate, and the lead wire is inserted into the elongated slit from the one side of the base plate, a portion of the length of the lead wire extends along the elongated slit with the portion of the length of the lead wire being located substantially between the two sides of the base plate and extending in the length direction of the lead wire parallel to the length dimension of the elongated slit, and is led out of the elongated slit to the other side of the base plate.

2. The power unit for a movable member according to claim 1, further comprising a rotational body side case defining a first storage space, wherein the rotational body is disposed in the case and is fixed to the one side of the base plate, and the case has an end provided adjacent to the elongated slit so as to prevent the lead wire from falling out of the elongated slit to the one side by the case.

3. The power unit for a movable member according to claim 1, further comprising: a gear side case defining a second storage space; and a speed reduction mechanism of the motor disposed in the gear side case and fixed to the other side of the base plate, and the gear side case has an end provided adjacent to the elongated slit so as to prevent the lead wire from falling out of the elongated slit to the other side by the case.

4. The power unit for a movable member according to claim 1, further comprising:
- a rotational body side case defining a first storage space, wherein the rotational body is disposed in the rotational body side case and is fixed to the one side of the base plate; and
- a gear side case defining a second storage space; and a speed reduction mechanism of the motor disposed in the gear side case and fixed to the other side of the base plate,
wherein the rotational body side case has an end provided adjacent to one side of the elongated slit, the gear side case has an end provided adjacent to the other side of the elongated slit, and the lead wire is prevented from falling out of the elongated slit from the both sides by respective ends of the rotational body side case and the gear side case.

5. The power unit for a movable member according to claim 1, wherein an entrance side cover having a semicircular shape in cross section and evaginating to the other side is provided at a first end of the elongated slit in close vicinity to the annular coil part.

6. The power unit for a movable member according to claim 5, wherein the gear side case partitioning the second storage room in which the speed reduction mechanism of the motor is placed is fixed to the other side of the base plate, and the end of the gear side case is approximated to or made to touch the lead wire at a side which is not covered with the entrance side cover.

7. The power unit for a movable member according to claim 1, wherein an exit side cover having a semicircular shape in cross section and evaginating to the one side is provided at a second end of the elongated slit separated from the annular coil part.

8. The power unit for a movable member according to claim 7, wherein a rotational body side case partitioning a first storage room in which the rotational body is placed is fixed to the one side of the base plate, and an end of the rotational body side case is approximated to or made to touch the lead wire at a side which is not covered with the exit side cover.

9. The power unit for a movable member according to claim 1, wherein an entrance side cover having a semicircular shape in cross section and evaginating to the other side is provided at a first end of the elongated slit in close vicinity to the annular coil part, and an exit side cover having a semicircular shape in cross section and evaginating to the one side is provided at a second end of the elongated slit separated from the annular coil part.

10. The power unit for a movable member according to claim 9, wherein a gear side case partitioning a second storage room in which a speed reduction mechanism of the motor is placed is fixed to the other side of the base plate, and an end of the gear side case is approximated to or made to touch the lead wire at a side which is not covered with the entrance side cover.

11. The power unit for a movable member according to claim 9, wherein a rotational body side case partitioning a first storage room in which the rotational body is placed is fixed to the one side of the base plate, and an end of the rotational body side case is approximated to or made to touch the lead wire at a side which is not covered with the exit side cover.

* * * * *